US005949042A

United States Patent [19]

Dietz, II et al.

[11] Patent Number: 5,949,042

[45] Date of Patent: *Sep. 7, 1999

[54] INSTANT, MULTIPLE PLAY GAMING TICKET AND VALIDATION SYSTEM

[76] Inventors: Michael J. Dietz, II, 7 Tildios, Peralta, N.Mex. 87042; Earl D. Morris, 9505 Seabrook NE., Albuquerque, N.Mex. 87111; Rolen A. Miller, 5 Camino De Corrales Del Norte, Corrales, N.Mex. 87048

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,005

[22] Filed: Jan. 21, 1997

[51] Int. Cl.[6] ...................................................... G06F 17/00

[52] U.S. Cl. .................... 235/375; 235/381; 235/462.01; 235/487; 273/138.1; 273/139; 273/148 R

[58] Field of Search .................................... 235/375, 380, 235/381, 462, 383, 487, 462.01; 273/138 A, 138 B, 143 R, 148 R, 139, 138.1

[56] References Cited

U.S. PATENT DOCUMENTS

| | | | |
|---|---|---|---|
| 4,191,376 | 3/1980 | Goldman et al. | 235/385 X |
| 4,323,770 | 4/1982 | Dieulot et al. | 235/375 |
| 4,373,726 | 2/1983 | Churchill et al. | 273/138 A |
| 4,669,729 | 6/1987 | Solitt et al. | 273/138 A |
| 4,689,742 | 8/1987 | Troy et al. | 273/138 A X |
| 4,725,079 | 2/1988 | Koza et al. | 283/73 |
| 4,764,666 | 8/1988 | Bergeron | 235/380 |
| 4,817,949 | 4/1989 | Bachman et al. | 273/139 |
| 4,839,507 | 6/1989 | May | 235/381 |
| 4,842,278 | 6/1989 | Markiwicz | 273/138 A |
| 4,880,964 | 11/1989 | Donahue | 235/462 |
| 5,039,848 | 8/1991 | Stoken | 235/381 |
| 5,290,033 | 3/1994 | Bittner et al. | 235/381 X |
| 5,346,258 | 9/1994 | Behm et al. | 283/102 |
| 5,348,299 | 9/1994 | Clapper, Jr. | 273/138 A |
| 5,377,975 | 1/1995 | Clapper, Jr. | 273/138 A |
| 5,475,205 | 12/1995 | Behm et al. | 235/375 |
| 5,487,544 | 1/1996 | Clapper, Jr. | 273/138 A |
| 5,536,008 | 7/1996 | Clapper, Jr. | 463/16 |
| 5,682,819 | 11/1997 | Beaty | 235/375 X |

*Primary Examiner*—Michael G. Lee
*Attorney, Agent, or Firm*—Townsend and Townsend and Crew LLP; Guy W. Chambers

[57] ABSTRACT

A multiple play gaming ticket, such as a pull-tab ticket 10 or "instant winner" lottery ticket, and a coordinating validation system. In its preferred form, the pull-tab ticket has multiple groups or plays 26 of indicia 22 which each create an independent opportunity to win. To deter fraud, a validation code 24 is provided which uniquely identifies the pull-tab ticket 10 and is not merely a representation of the indicia 22. The pull-tab ticket 10 is validated by a combination of validator machine 30 and a host computer 100. The validator machine reads the validation code and relays it the host computer to check for legitimacy (i.e., proper form and availability) and to correlate it to a stored record of gaming indicia 22. If approved, the host computer sends its record of gaming indicia back to the validator machine for display on monitor 50 and pay-out, as appropriate.

20 Claims, 6 Drawing Sheets

INSTANT, MULTIPLE PLAY GAMING TICKET AND VALIDATION SYSTEM

TECHNICAL FIELD OF THE INVENTION

The present invention relates to pull-tabs, lottery tickets and other self-contained or "instant winner" gaming tickets. More particularly, a multiple play ticket is disclosed which, in the preferred embodiment, is protected from fraud through the use of unique validation codes which are not merely a representation of the ticket's gaming indicia. A validator machine is also disclosed which, in conjunction with a host computer, can validate a player's ticket, display each of the plays on a monitor and issue redeemable vouchers for winning tickets.

BACKGROUND OF THE INVENTION

The distribution of "instant winner" gaming tickets, such as "pull-tabs" and "scratcher" lottery tickets, has become an increasingly popular way to allow people to win money or valuable prizes. Typically, a large number of such pull-tab or lottery tickets are printed up by a promoter for distribution to players. Each of these pull-tabs or lottery tickets will have a printed arrangement of indicia on them, such as numbers or fruit symbols, which, under the rules of the game, will correspond to either winning or losing combinations. Generally, a fewer number of winning tickets will be produced for more valuable prizes and a greater number of winning tickets will be produced for less valuable prizes.

In order to enhance the enjoyment of play and prevent fraud, the indicia on the pull-tab or lottery ticket are normally hidden from view at the time the pull-tab or lottery ticket is distributed. In this way, the player will not initially know whether he has drawn a winning or losing ticket. In order for the player to determine if he has a winning or losing ticket, the player must generally pull away an opaque surface on the ticket to reveal the inclicia. In the case of a pull-tab, this opaque surface is typically a paper or cardboard pull-tab cover. In the case of lottery tickets, such as popular "scratcher" tickets, this opaque surface is a gum-like material which can be rubbed off the ticket using the edge of a coin or the player's finger nail.

A continuing concern for pull-tab and lottery promoters is fraud. For example, if a player draws a losing pull-tab, he might be tempted to alter or tamper with that losing pull-tab to make it look like a winning pull-tab and then try to redeem it as a winning pull-tab. To deter such fraud, validation codes which are not readily decipherable to the player, such as bar codes, have been placed upon the outside of pull-tabs. In many cases, these validation codes simply identify, in code form, the combination of indicia inside the pull-tab so that if those indicia are altered, the fraud can be easily exposed. Unfortunately, once a player is able to recognize which validation codes correspond to winning pull-tab tickets, particularly a player who can choose from among a stack of pull-tabs, the player might pick for himself only pull-tabs with winning validation codes.

In order to increase the convenience and enjoyment of pull-tab games, pull-tab dispensing and display machines have been developed. One such pull-tab dispensing and display machine is shown in Clapper's U.S. Pat. No. 5,377,975. In the Clapper machine, a roll of two-ply pull-tab strips is stored, with each pull-tab ply having an identical set of pull-tab indicia. Upon actuation of the Clapper machine by insertion of the player's money, the two plies of the pull-tab strip are internally separated with one of the plies being dispensed open-faced to the player and the other ply being kept by the machine for use in displaying the indicia on a monitor and for record keeping purposes.

While the Clapper machine adds a certain degree of interest and convenience to the pull-tab game, it nonetheless has several disadvantages. First of all, since an open-faced pull-tab is dispensed by the Clapper machine and simultaneously displayed, the Clapper machine is classified as an illegal gambling machine in many jurisdictions. In the eyes of these jurisdictions, the Clapper pull-tab machine is little more than a video slot machine which simultaneously dispenses a written representation of the video display.

Another disadvantage of the Clapper machine, and of nearly all other existing pull-tab and lottery ticket systems, is that there is only one play per ticket. In a business where it is important to both maximize profits and, at the same time, the returns received by the player, the cost of printing pull-tabs becomes a significant concern. The higher the pull-tab printing costs are, the less money there is to distribute in profits to the pull-tab promoter and winnings to the player.

SUMMARY OF THE INVENTION

The present invention provides a multiple play gaming ticket, such as a pull-tab or lottery ticket, and a secure validation system. In its preferred form, the gaming ticket of the present invention is a pull-tab formed of two sheets of a cardboard like material with a peel away section formed in one of the sheets. When the peel away section is peeled away, a unique validation code and multiple plays of arrayed indicia are exposed. In one form of such a pull-tab, the validation code is a unique bar code and the multiple plays are twenty sets of single digit numbers each arrayed in three rows and three columns. In this embodiment, if there are matching numbers along any horizontal, vertical or diagonal line of an array, the play is a winning play.

In its preferred form, the validation system of the present invention includes a combination of a computerized validator machine and a host computer. To operate the validation machine, the player preferably inserts an opened pull-tab into the pull-tab slot. The validation machine then reads the validation code and relays the validation code to a host computer. In the preferred embodiment, there is a unique validation code for every pull-tab which does not merely encode the pull-tab indicia. At the host computer, the unique pull-tab validation code is checked for legitimacy (i.e., proper form and availability) and then correlated to a stored record of gaming indicia for that pull-tab. If the code is validated by the host computer, the host computer sends its approval back to the validation machine along with an electronic record of all the plays for that particular pull-tab. The player is then given the option of having the plays sequentially displayed on the validator monitor or of immediately cashing out. As part of a game display, the validator monitor will show which indicia combinations create winning plays and keep track of accumulated winnings. At the conclusion of play, a voucher will automatically be printed out by the validator which can then be redeemed.

DESCRIPTION OF THE SPECIFIC EMBODIMENTS

Figure 1A:
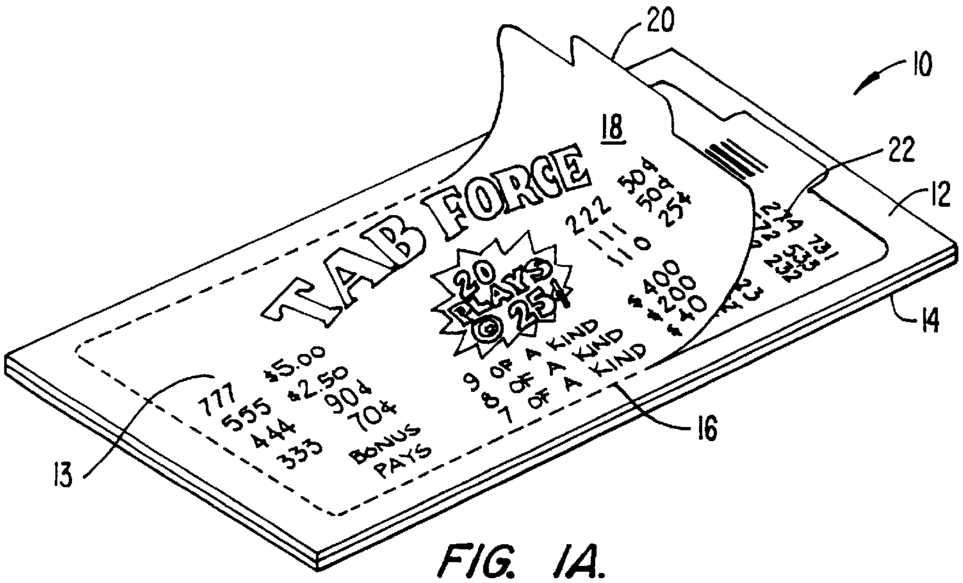
FIG. 1A shows a perspective view of a partially opened pull-tab of the present invention.

The invention includes both a secure, multiple play gaming ticket and a coordinating system of validation machines. Referring now to FIG. 1A, a preferred form of gaming ticket in the form of a pull-tab 10 is shown. This pull-tab 10 is preferably formed of two sheets 12, 14 of an opaque paper or cardboard-like material which are joined together along their edges with a suitable adhesive, such as rubber cement or other paper glue. On the outside of one of the sheets 12, a table 13 is preferably shown which illustrates combinations of indicia that would be considered winning combinations and how much each of these winning combinations would win. Perforations 16 are punched into the top sheet 12 so as to create a peel-away section 18 on the top sheet 12. To play the game, the player grips the tab 20 of the peel-away section 18 and pulls the peel-away section 18 back from the remainder of the pull-tab 10.

Gaming tickets 10 for use with the present invention may alternatively be formed in any number of other ways which are known to those of skill in the art. For example, instead of having a peel-away section 18 covering the playing indicia 22, an opaque gum may be used to cover the playing indicia 22 as is now done on "scratcher" games. The important objective is to cover the playing indicia 22 from view until the ticket has been distributed and placed in the hands of the player. The player should then be able to easily remove the opaque covering to determine whether or not he has a winning ticket.

Figure 1B:
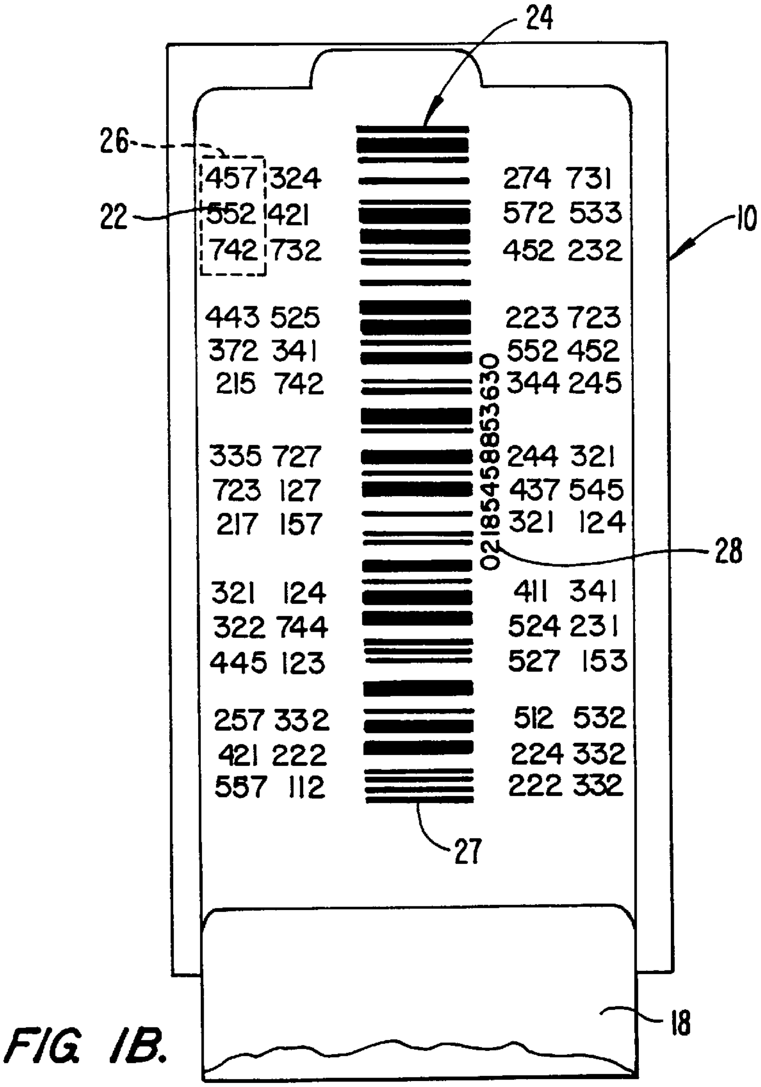
FIG. 1B shows a plan view of the inside of an opened pull-tab of the present invention with the displayed indicia and unique bar code.

FIG. 1B shows the inside of a preferred form of pull-tab 10. In this preferred form of pull-tab 10, the playing indicia 22 are in the form of single digit numbers arrayed in rows and columns on each side of a validation bar code 24. Each play 26 would consist of 3 rows and 3 columns of such single digit numbers. In the pull-tab ticket 10 shown in FIG. 1B, there are twenty such plays 26. As is known in the art, a variety of other types of indicia 22 can be used in place of the single digit numbers shown in FIG. 1B including fruit indicia, such as cherries, plums and oranges, as well as non-fruit indicia, such as bells, bars and sevens. Such indicia 22 can also be arrayed in a wide variety of ways, including in different numbers of columns and rows. Moreover, it is not necessary that twenty plays be put on each pull-tab ticket 10. Nonetheless, to reduce printing costs and thereby increase player returns and promoter profits, it is preferable to have multiple plays on each ticket 10.

Determining which of the pull-tab plays 26 are winning plays can be done in a variety of ways. For example, having all the same numbers on any horizontal, vertical or diagonal line can be used to create a winning play in a manner analogous to an "8-liner" slot machine. Alternatively, a pull-tab promoter might require all of the numbers in an entire play 26 to be the same before making that a winning play. Since finding a play with all the numbers being the same is usually rare, such a requirement might be made only for well rewarded winning plays. For less well rewarded winning plays, the pull-tab promoter may only require that a certain number, such as a "1", be found within the play, regardless of the remaining numbers. In the preferred embodiment, a mixture of criteria is used to determine winning plays so that winning plays with smaller rewards are fairly frequently achieved in order to maintain player interest while winning plays with large rewards are infrequently achieved in order to allow the promoter to have a reasonable profit.

A validation code 24 is preferably found within the pull-tab 10 and is a unique code which does not merely encode the playing indicia 22. In a preferred form of the invention, the validation code 24 is a bar code 27 representing a corresponding 14 digit sequence 28 which is also printed on the pull-tab 10 next to the bar code 26. The first seven digits of this validation code sequence 28 preferably identify the batch from which the pull-tab 10 came. The next six digits preferably identify the number of the specific pull-tab 10 within that batch. The last digit represents a checksum of the other 13 digits. To further improve game security, this 14 digit validation code can be encrypted with an encryption algorithm using a randomly generated encryption number so that someone cannot identify the batch and specific pull-tab numbers from simply reading the validation code number 28, unless they have access to the encryption key.

It should be noted that the use of a unique validation code 24 for each pull-tab 10, one which does not merely encode the playing indicia 22, has several advantages. First of all, a code which tries to capture all the information in multiple game plays would be very long and may not fit into the limited area of the pull-tab 10. Second, by detecting a unique code during the validation process, the pull-tab promoter can exactly identify the pull-tab 10 which is being validated and immediately detect a copy, counterfeit or reuse of a previously issued pull-tab. This exact identification also allows the promoter to keep track of the play for all of the pull-tabs in a particular batch through the use of accounting software. Finally, the unique validation code 24 prevents players or promoters from using their knowledge of the bar code from a previous winning pull-tab to pick and choose from among newly issued pull-tabs to select only the winning pull-tabs.

While use of an internally-placed validation code 24 in the form of a unique bar code 27 and numeric translation 28 is the preferred embodiment, those of skill in the art will recognize that many other sorts of validation code placements and unique validation codes 24 can be used. For example, if the validation code 27 is encrypted, it could easily be placed on the outside of the pull-tab 10 with minimal loss of security. Also, when there are fewer game plays 26 per pull-tab ticket 10, the validation code 24 could uniquely encode both the origin of the pull-tab 10 and the contents of the pull-tab games 10.

Figure 2:
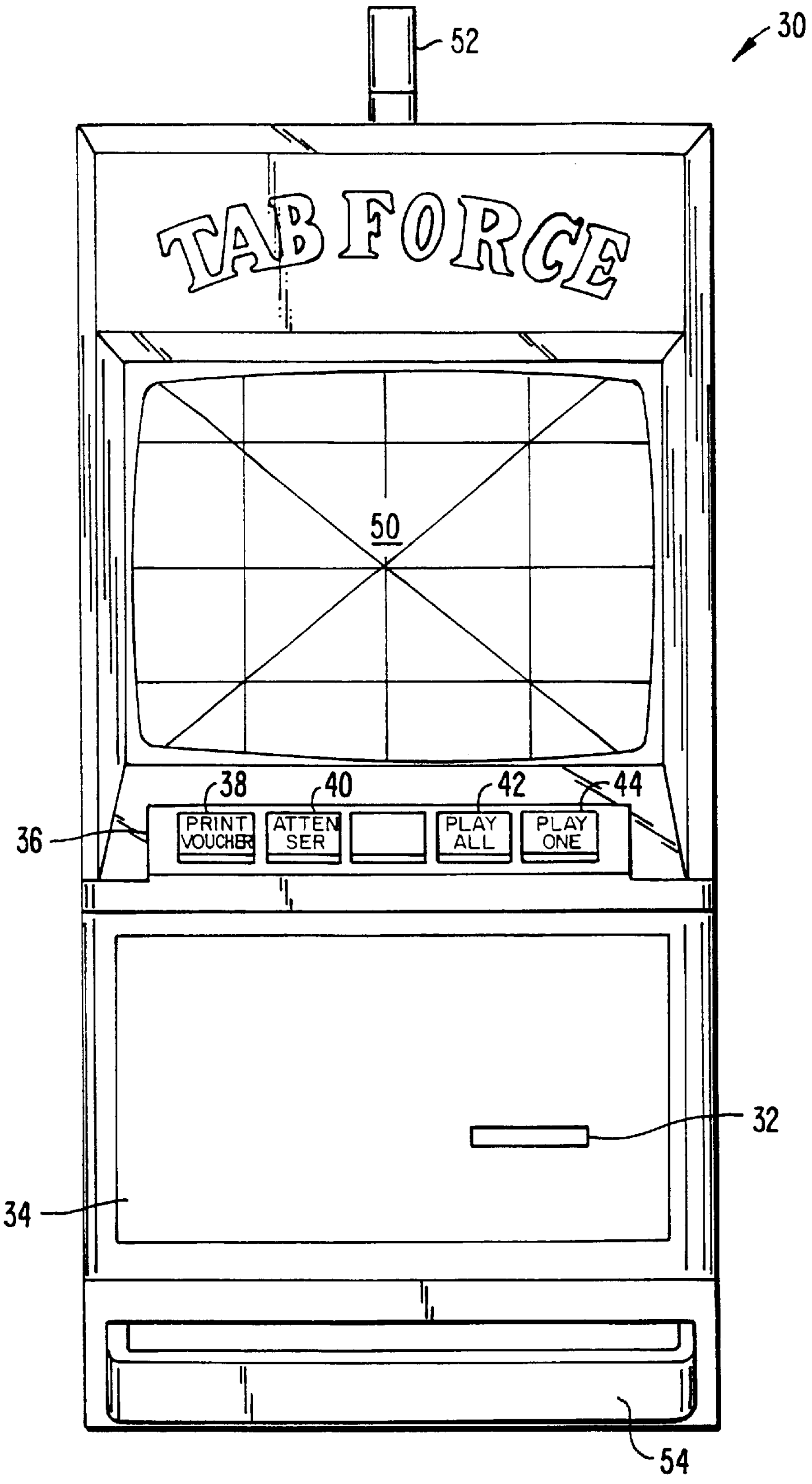
FIG. 2 shows a front view of a preferred form of pull-tab validator machine of the present invention.
Figure 5:
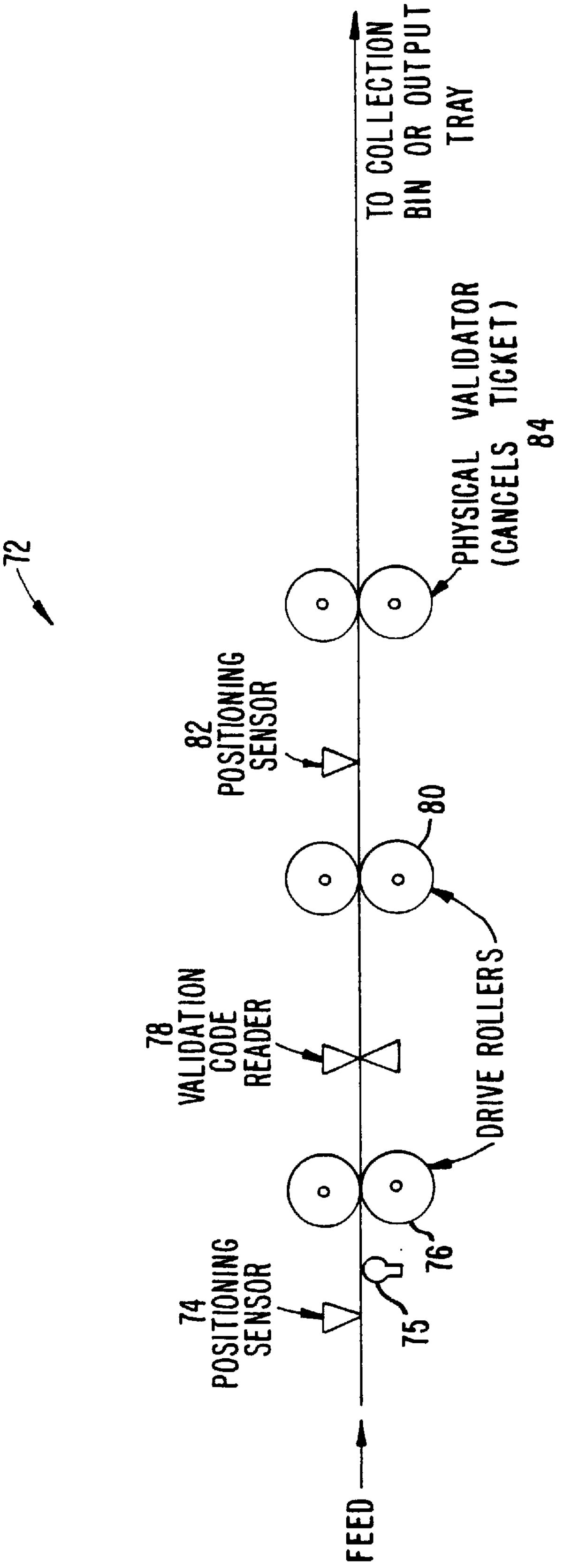
FIG. 5 schematically illustrates the pull-tab feed, processing and sensing mechanism for the pull-tab validator machine of the present invention.

Turning now to FIG. 2, an electronic validator machine 30 for use with the pull-tabs 10 of the present invention is shown. The purpose of this electronic validator 30 is to accept pull-tabs 10, determine whether the pull-tabs 10 are legitimate and effectuate the results of game play. To accomplish these purposes, pull-tab acceptor slot 32 is provided on the validator console 34. The pull-tabs 10 are preferably inserted into this slot 32 after they have already been opened by the player. In an alternative embodiment of the invention, the pull-tab 10 can be inserted into the pull-tab acceptor slot 32 in unopened form. In this alternative embodiment, a validation code 24 would either have to be printed on the outside of the pull-tab 10, readable through the opaque sheets 12, 14 of the pull-tab or a mechanism would need to be incorporated into the pull-tab validator 30 which removes the peel-away tab 18, such as the thumper 75 shown in FIG. 5.

The pull-tab validator 30 preferably includes a panel of buttons 36 to facilitate its use. Among these buttons is a "PRINT VOUCHER" button 38 which allows the player or other validator user to, at any time, have a redeemable voucher printed out which summarizes the results of game play. While a voucher will normally be automatically issued at the end of game play, this "PRINT VOUCHER" button allows the player to curtail game play at any point and have the voucher issued immediately. The information on this voucher preferably includes at least some validator identification information (e.g., terminal number, location name and address), the time and date of game play, the validation code 24 and the amount of the player's winnings. In an alternative embodiment, this voucher could show the indicia 22 from all the plays 26 on the pull-tab ticket 10. In another alternative embodiment, which achieves essentially the same objective, the voucher identification information (e.g., terminal number, location name and address) could be printed on the pull-tab ticket 10 itself by the pull-tab validator 30, thus eliminating the need for an additional voucher document.

An "ATTENDANT SERVICE" button 40 is provided to allow the player to summon an attendant in the case of validator malfunction or other need for assistance. "PLAY ALL" 42 and "PLAY ONE" 44 buttons are provided to allow the player to have the various plays on the pull-tab ticket either skipped or individually displayed on the video monitor 50. The "PLAY ALL" button directs the validator 30 to either skip or rapidly display all of the individual plays on the pull-tab 10. By contrast, the "PLAY ONE" button permits the player to display the game plays 26 one at a time. In order to increase player enjoyment of the pull-tab game, the plays are preferably displayed in random order rather than in the sequence they are presented on the pull-tab ticket 10.

While, in the preferred embodiment, the panel of buttons 36 is shown as being part of the validator console 34, the panel of buttons 36 could also be incorporated. into a "touch screen" form of monitor 50. Suitable touch screens for use with the present invention include the TRUEPOINT™ capacitive sensing screen produced by MicroTouch Systems, Inc. of Methuen, Mass. and the INTELLITOUCH acoustic wave sensing screen produced by ELO Touchsystems of Oak Ridge, Tenn. Using such a touch screen monitor 50, the player can activate the buttons 36 of his choosing by simply touching the appropriate area of the touch screen monitor 50.

Figure 3A:
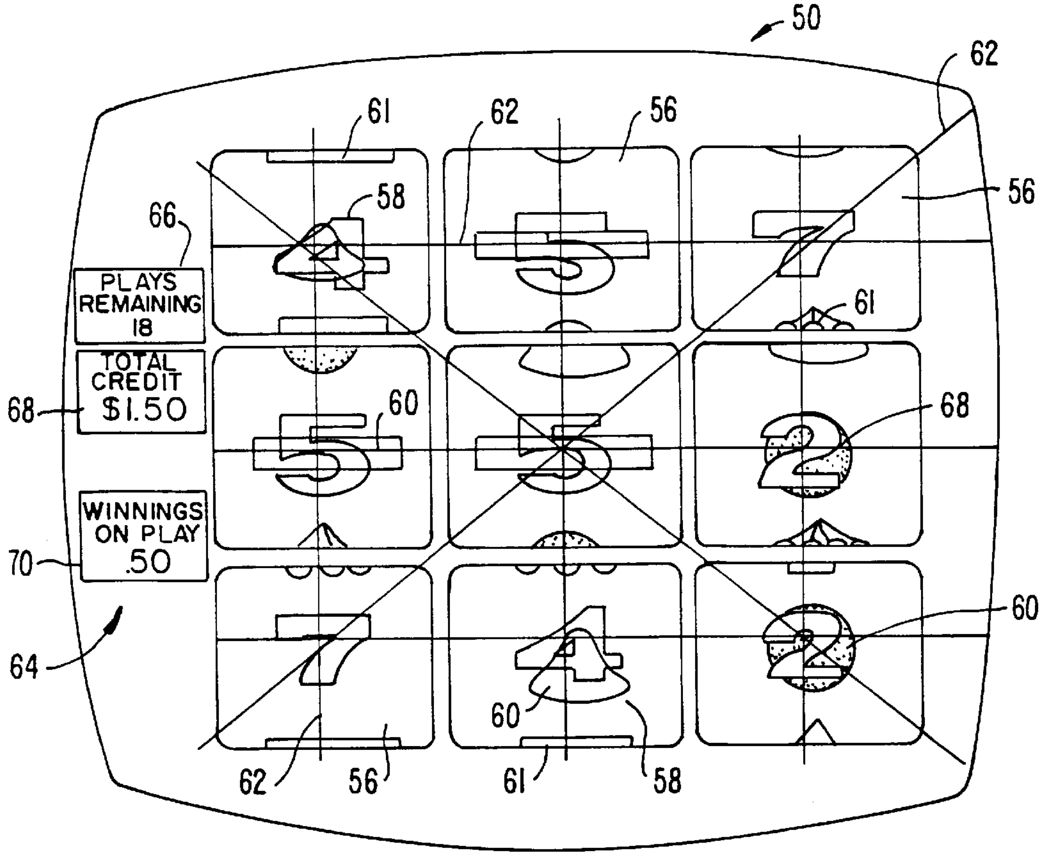
FIG. 3A shows a close-up front view of the pull-tab validator machine monitor of the present invention with displayed indicia from a typical game play.
Figure 3B:
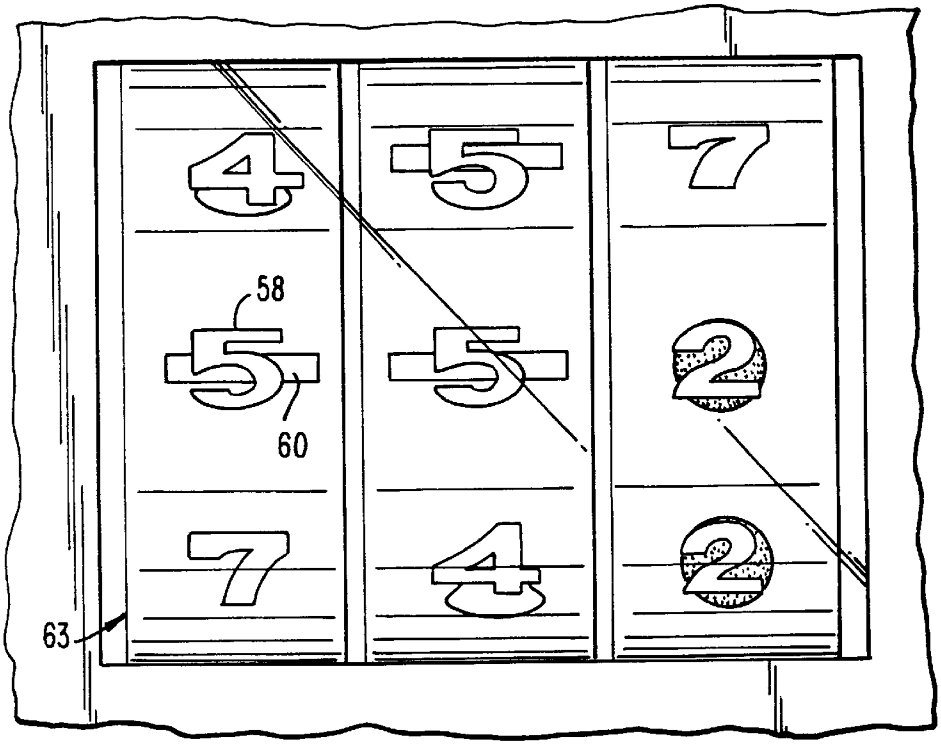
FIG. 3B shows a close-up front view of a stepper reel pull-tab validator embodiment which constitutes an alternative way of displaying indicia firm a typical game play.

At the top of the validator unit 30, a lamp 52 is provided. This lamp 52 can be used to help summon an attendant when the "ATTENDANT SERVICE" button 40 is pressed or, with coordinating sound effects, create a festive display when a winning play is shown. At the bottom of the validator 30 is a tray 54 which can be used to dispense printed vouchers to the player at the end of game play. This tray 54 can also be used to return pull-tab tickets 10. As an alternative, such pull tab tickets 10 could be returned through the pull-tab acceptor slot 32 into which they were inserted A close-up view of the validator monitor 50 is shown in FIG. 3 with the display of a typical game play. In this example of a game play display, nine display boxes 56 are arrayed in three rows and three columns. In the middle of each of these display boxes 56, a composite symbol 58 is shown. This composite symbol 58 corresponds to the indicia 22 on the pull-tab for the particular pull-tab play 26 which is currently being played. For example, if a "4" is shown in the upper left hand corner of the pull-tab play 26 being displayed (FIG. 1B), a "4" would also appear in the upper left hand display box 56 on the monitor 50 while that play is being shown. To provide further interest for the player, the single digit indicia 22 from the pull-tab ticket 10 can be superimposed over a popular color gaming symbol 60 which is assigned to that number, such as an orange, plum, cherry or bar, to create the composite symbols 58 shown in FIG. 3. Also, half-symbols 61 can be added at the top and bottom of each display box 56 to make the display appear similar to that of a slot machine.

While a validator machine 30 with an electronic display has thus far been described to illustrate the principles of the present invention, those of skill in the art will readily recognize that a more mechanical machine could alternatively be used to display gaming results. For example, rather than generating video displays on monitor 50, the type of mechanical stepper reels 63 (FIG. 3B) which are in common use in slot machines could be used instead to display gaming results. In the case of such mechanical stepper reels, the stepper reels could be put into motion during play and directed to stop at positions corresponding to the final composite symbols 58 at the end of play.

If a particular combination of composite symbols 58 on the monitor creates a winning combination, this can be shown on the monitor in a variety of ways. For example, each of the symbols in the winning combination can be lit up or, in the case where winning combinations are formed on horizontal, vertical or diagonal lines, a line 62 can be created on the monitor which connects the winning symbols. At the time a winning combination is shown on the monitor 50, the lamp 52 (FIG. 2) can be lit and pleasing sounds can be made to emanate from the validator 30 to increase the player's enjoyment of his winning combination.

To assist the player in keeping track of the progress of his game play, a series of information boxes 64 can be provided on the monitor. In the preferred embodiment, a "PLAYS REMAINING" information box 66 tells the player how many plays remain to be displayed from his pull-tab ticket 10, a "TOTAL CREDIT" information box 68 tells the player the total of his winnings from the pull-tab ticket 10 being displayed and a "WINNINGS ON PLAY" information box 70 tells the player what amount of winnings are generated from the particular play being displayed at that time. If desired, both the number and other identifying features of the pull-tab 10 could also be displayed on the monitor 50 as part of the information boxes 64.

Figure 4:
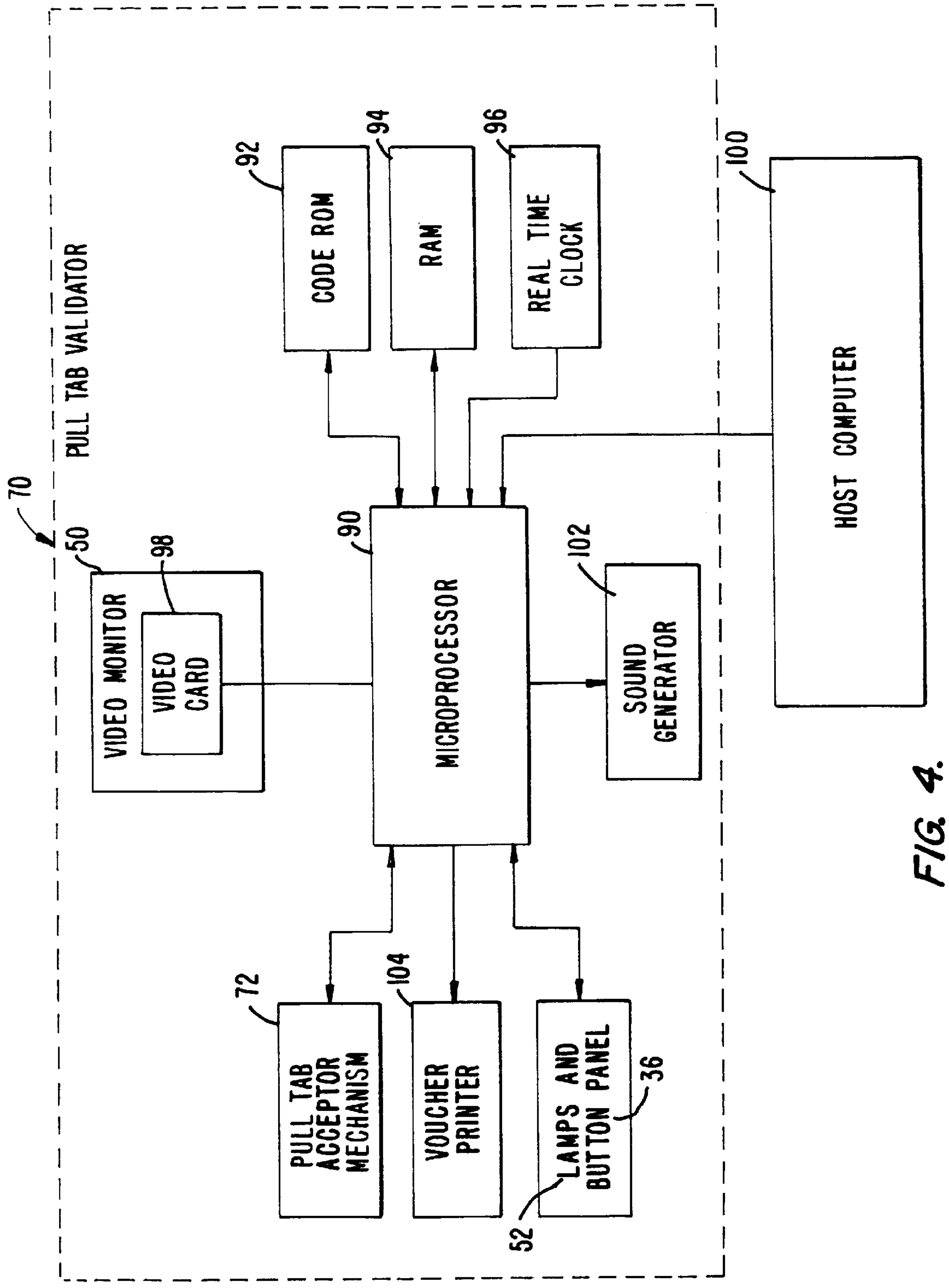
FIG. 4 is a block diagram which schematically shows the control system for the pull-tab validator machine of the present invention and its interaction with a host computer.

In the preferred embodiment, the validator 30 of the present invention is controlled by validator computer circuitry 70 which is schematically illustrated in FIG. 4. Operation of this validator computer circuitry 70 begins with insertion of a pull-tab 10 into the pull-tab acceptor mechanism 72. The operation of this pull-tab acceptor mechanism 72 is shown in further detail in FIG. 5. After the pull-tab ticket 10 is fed into the pull-tab acceptor slot 32 (FIG. 2), its presence and orientation is sensed by positioning sensor 74 and relayed to the microprocessor 90. If the pull-tab 10 is in an appropriate position, the microprocessor 90 will activate the drive rollers 76 to advance the pull-tab 10 and allow its validation code 24 to be read by validation code reader 78. Where the validation code 24 is a printed bar code 27 which is placed on the outside of the pull-tab ticket 10 or made visible through use of an opened pull-tab ticket in the validator 30, the validation code reader 78 would typically be an optical character reader.

Alternatively, where the inserted validation code 24 is not visible when placed under the validation code reader, other types of validation code 24 printing and validator code readers can be used to still allow the validation code to be read. For example, the validation code 24 could be printed on the inside of the pull-tab card 10 with a metallic ink and then sensed with a validation code reader 78 which uses x-rays. Similarly, the validation code 24 could be printed on the inside of the pull-tab ticket with an infrared detectable ink and be read with an infrared validation code reader 78.

The information obtained by the validation code reader 78 is then passed back to the microprocessor 90 for analysis (FIG. 4). If the pull-tab ticket 10 is determined to be legitimate, it is forwarded by driver rollers 80 past positioning sensor 82 to the physical validator 84. At the physical validator 84, this legitimate pull-tab ticket 10 is physically validated, for example by punching holes, and then passed along to the validator collection bin (not shown) for retention by the validator 30. If the pull-tab ticket has been misinserted or should be returned for any other reasons, it can be diverted, without physical validation, to the tray 54 and picked up by the player. In an alternative embodiment, a validated pull-tab ticket 10 can also be diverted to the tray 54 so that it can be retained by the player. By programming the validation code reader 78 to observe and report any physical validation of the pull-tab ticket 10, the validator 30 of the present invention can prevent any pull-tab ticket 10 from being redeemed twice.

Turning again to FIG. 4, the microprocessor 90 makes up the heart of the validator computer circuitry 70. Suitable microprocessors include the Z80 microprocessor manufactured by Zilog, Inc. of Campbell, Calif. and the PENTIUM™ microprocessor manufactured by Intel Corporation of Santa Clara, Calif. The microprocessor 90 relies upon programming instructions stored in code read-only memory (CODE ROM) 92 to execute the game play sequence and create appropriate video displays. The CODE ROM 92 might suitably be a WSIPSD512 chip produced by Wafer-Scale Integration, Inc. of Fremont, Calif. To assist the microprocessor 90 in processing game play information, a random access memory (RAM) 94 and real time clock 96 are preferably provided. The RAM 94 might suitably be a non-volatile 384K RAM chip. A suitable real time clock 96 would be a 2K non-volatile "Dallas Timekeeper" RAM produced by Dallas Semiconductor of Dallas, Tex.

In conjunction with a video card 98, the microprocessor 90 controls the displays on video monitor 50. In the preferred embodiment, the video card 98 contains a symbol graphics erasable, programmable read on memory (EPROM), a static graphics EPROM and a random access memory (RAM). The microprocessor also controls lamps 52, button panel 36, sound generator 102 and voucher printer 104.

Figure 6:
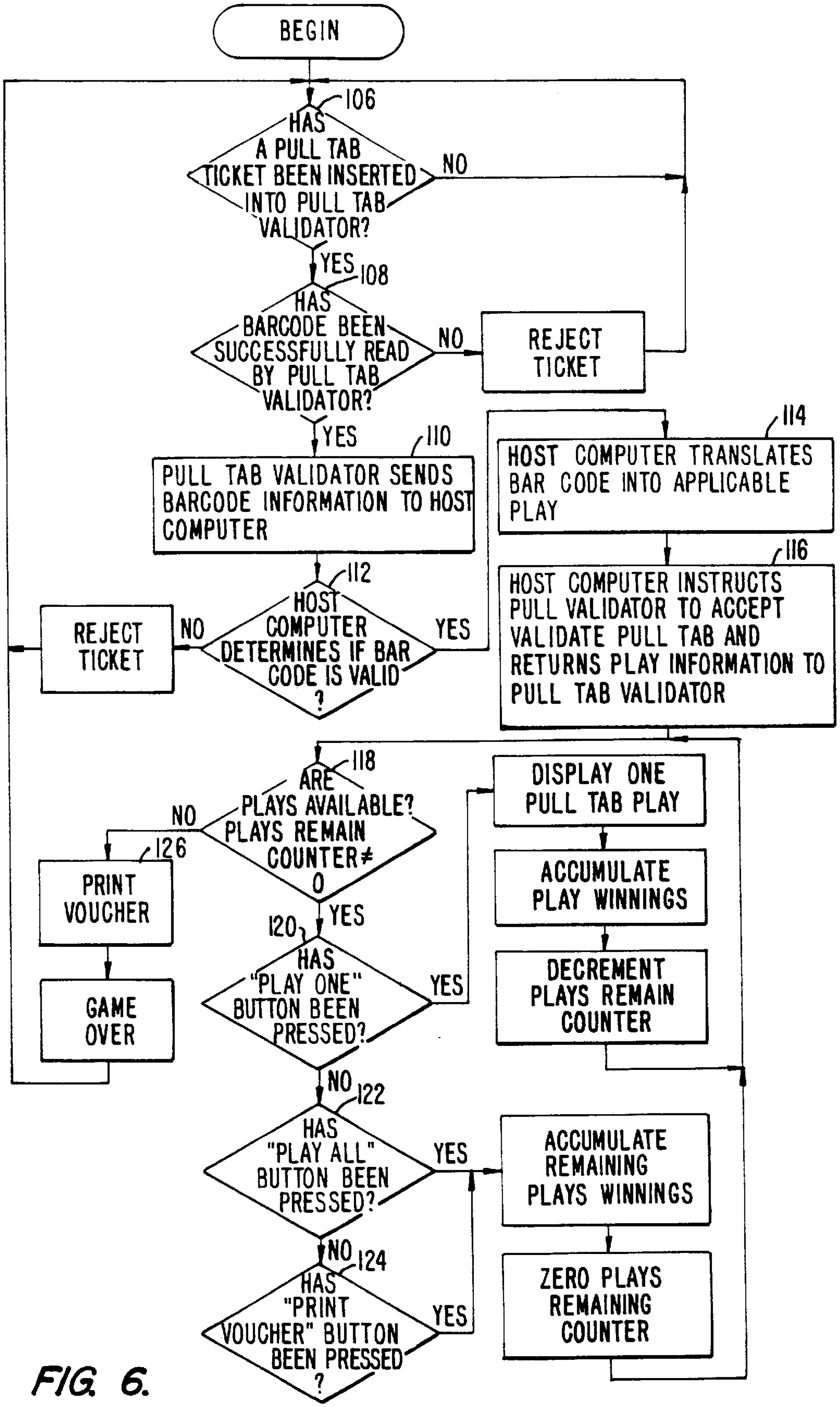
FIG. 6 is a flow chart for the sequence of play using the pull-tab validator machine of the present invention.

For security purposes, the validator microprocessor 90 preferably works in conjunction with a separate host computer 100 to validate pull-tab tickets 10. As shown in the sequence of game play flow chart of FIG. 6, one of the first tasks of the microprocessor 90, after the pull tab ticket has been inserted into the validator 30, 106 and the validation code 24 has been successfully read by the validation code reader 78, 108 is to determine whether that validation code 24 is a legitimate validation code 112. In the preferred embodiment, the validator microprocessor 90 communicates 110 that validation code 24 to a secure host computer 100 which has a list of valid codes and corresponding game plays stored in its memory. If the validation code 24 is encrypted, the host computer 100 will have an encryption key.

When the host computer 100 receives a validation code inquiry from a validator 30, it will compare the communicated validation code 24 against its list of validation codes to determine, among other things, whether the communicated validation code 24 is in proper form and whether it corresponds to a pull-tab ticket 10 that is available for play 112 (e.g., not previously used). If the validation code 24 is determined by the host computer 100 to be legitimate, the host computer 100 will retrieve the game play information 114 corresponding to that validation code 24 from its memory and store pertinent information about the player's use of the particular pull-tab 10 (e.g., date, time, identification of validator, authorized winnings etc.). By collecting information from these validation checks, the host computer 100 can closely monitor pull-tab usage. The host computer 100 will conclude its validation check for legitimate pull-tabs by sending an electronic summary of the pull-tab game plays 26 to the validator 30 along with instructions to accept the pull-tab card 116. If the host computer determines that a validation code 24 is not legitimate, it will instruct the validator 30 to end the game and, where appropriate, notify the promoter that an attempt has been made to redeem an illegitimate pull-tab ticket 10.

While use of a host computer 100 to assist in the validation process is preferred in order to allow a centralized collection of game play information and enhance security, those of skill in the art will readily recognize that the entire validation process can be done within the confines of the validator 30 itself. In this alternative embodiment, lists of active pull tab validation codes 24 and corresponding game play information can be periodically loaded into the validator RAM 94 to allow the validator microprocessor 90 to independently perform its own validation checks. As another alternative, game play information could be incorporated into the validation code 24 to allow the validator microprocessor 90 to perform game play without needing to continually have its RAM 94 updated with information about active validation codes 24.

Regardless of whether the validator 30 acts alone or in conjunction with a host computer 100, it is preferred that the validator 30 store in its RAM 94 various information about game play. This information might advantageously include information about dates and times of game play, the validation codes of inserted pull-tabs, episodes of any rejected pull-tabs and a tabulation of authorized winnings.

When the host computer 100 communicates that a validation code 24 has been approved 116, the validator 30 allows the player to choose whether he wants to play one game at a time by pressing the "PLAY ONE" button 44, 120, whether he wants the games skipped or played all at once by pressing the "PLAY ALL" button 42, 122 or whether he wants a voucher immediately printed out by pressing the "PRINT VOUCHER" button 38, 124. In the preferred embodiment, the availability of these options is communicated to the player after validation has occurred by having the microprocessor 90 light up the "PLAY ONE" 44, "PLAY ALL" 42 and "PRINT VOUCHER" 38 buttons.

At the conclusion of the game, a voucher will automatically be printed 126 and provided to the player through the output tray 54. The player can then present this voucher to the promoter to collect any winnings specified on the voucher. Before determining that the game is concluded and a voucher should be issued, the microprocessor 90 will ask whether there are any remaining plays available 118. If the plays remaining counter has reached zero, the microprocessor 90 will conclude that game play is over and authorize issuance of a voucher. In place of a voucher, the validator 30 could, of course, alternatively issue cash winnings or electronically credit a player's credit card which has been inserted into the validator.

In the foregoing specification, the invention has been described with reference to specific preferred embodiments and methods. It will, however, be evident to those of skill in the art that various modifications and changes may be made without departing from the broader spirit and scope of the invention as set forth in the appended claims. For example, while use of the validator 30 has been discussed thus far from the perspective of the player, it could just as easily be used by the promoter to validate returned tickets. For such promoter-oriented valiclator machines 30, the display monitor 50 could be removed as an unnecessary component. As another example, the pull-tab ticket 10 could have a validation code 24 and no indicia 22. In this example, the player would have to insert his pull-tab ticket 10 into a validator 30 and press the "PLAY ONE" button 44 in order to find out what the indicia 22 are for his pull-tab ticket 10. The specification and drawings are, accordingly, to be regarded in an illustrative, rather than restrictive sense; the invention being limited only by the appended claims.

What is claimed is:

1. A method of securely determining validity of a gaming ticket showing at least one game play consisting of a combination of multiple numbers and/or symbols and displayong correct game play information for said gaming ticket comprising the steps of:

printing a validation code on a gaming ticket showing at least one game play consisting of a combination of multiple numbers and/or symbols which validation code uniquely indentifies said gaming ticket;

inserting said gaming ticket into a first validitor which reads said validation code and communicates said validation code to a separate second validator;

comparing said validation code within said second validator to a list of legitimate and available gaming ticket validation codes stored in a memory of said second validator and thereby determining whether said gaming ticket is valid;

finding a record of game play in a memory of said second validator which corresponds to said gaming ticket's validation code and includes a correct combination of multiple numbers and/or symbols for said gaming ticket;

communicating said second validator's approval of gaming ticket validity and the record of game play that corresponds to said gaming ticket to said first validator; and displaying on a video monitor or stepper reel of said first validator the correct record of game play combination of multiple numbers and/or symbols obtained from said second validator's memory for said gaming ticket.

2. The method of claim 1 further comprising the step of having said first validator prints out a record of game play.

3. The method of claim 2 wherein said first validator prints out record of game play information on said gaming ticket.

4. The method of claim 2 wherein said first validator prints out record of game play information on a voucher which is separate from said gaming ticket.

5. The method of claim 1 wherein said gaming ticket showing at least one game play consisting of a combination of multiple numbers and/or symbols is a pull tab.

6. The method of claim 1 wherein said record of game play also includes information about whether said gaming ticket is a winning or losing gaming ticket.

7. The method of claim 1 wherein each said game play consists of a combination of numbers.

8. The method of claim 1 wherein said gaming ticket shows a plurality of game plays.

9. The method of claim 1 wherein said correct record of game play combination of multiple numbers and/or symbols obtained from said second validator's memory are displayed on a video monitor incorporated within said first validator.

10. The method of claim 1 wherein said correct record of game play combination of multiple numbers and/or symbols obtained from said second validator's memory are displayed on a stepper reel incorporated within said first validator.

11. A method of securely determining validity of a gaming ticket showing at least one same play consisting of a combination of multiple numbers and/or symbols and displaying correct game play information for said gaming ticket comprising the steps of:

printing a validation code on a gaming ticket showing win at least one game play consisting of a combination of multiple numbers and/or symbols which validation code uniquely identifies said gaming ticket;

inserting said gaming ticket into a validator which reads said validation code;

comparing said validation code to a list of legitimate and available gaming ticket valiidation codes stored in a memory of said validator to thereby determine whether said gaming ticket is valid;

finding a record of game play in a memory of said validator which corresponds to said gaming ticket's validaton code and includes a correct combination of multiple numbers and/or symbols for said gaming ticket;

displaying on a video monitor or stepper reel of said validator the correct record of game play combination of multiple numbers and/or symbols obtained from said second validator's memory for said gaming ticket.

12. The method of claim 11 further comprising the step of having said validator prints out a record of game play.

13. The method of claim 12 wherein said validator prints out record of game play information on said gaming ticket.

14. The method of claim 12 wherein said validator prints out record of game play information on a voucher which is separate from said gaming ticket.

15. The method of claim 11 wherein said gaming ticket showing at least one game play consisting of a combination of multiple number and/or symbols is a pull tab.

16. The method of claim 11 wherein said record of game play also includes information about whether said gaming ticket is a winning or losing gaming ticket.

17. The method of claim 11 wherein each said game play consists of a combination of numbers.

18. The method of claim 11 wherein said gaming ticket shows a plurality of game plays.

19. The method of claim 11 wherein said correct record of game play combination of multiple numbers and/symbols obtained from said validator's memory are displayed on a video monitor incorporated within said validator.

20. The method of claim 11 wherein said correct record of game play combination of multiple numbers and/symbols obtained from said validator's memory are displayed on a stepper reel incorporated within said validator.

* * * * *